Aug. 29, 1967  H. L. LINDBLAD ETAL  3,338,155
APPARATUS FOR MERCHANDIZING HOT SANDWICHES
Filed Jan. 30, 1964  4 Sheets-Sheet 1
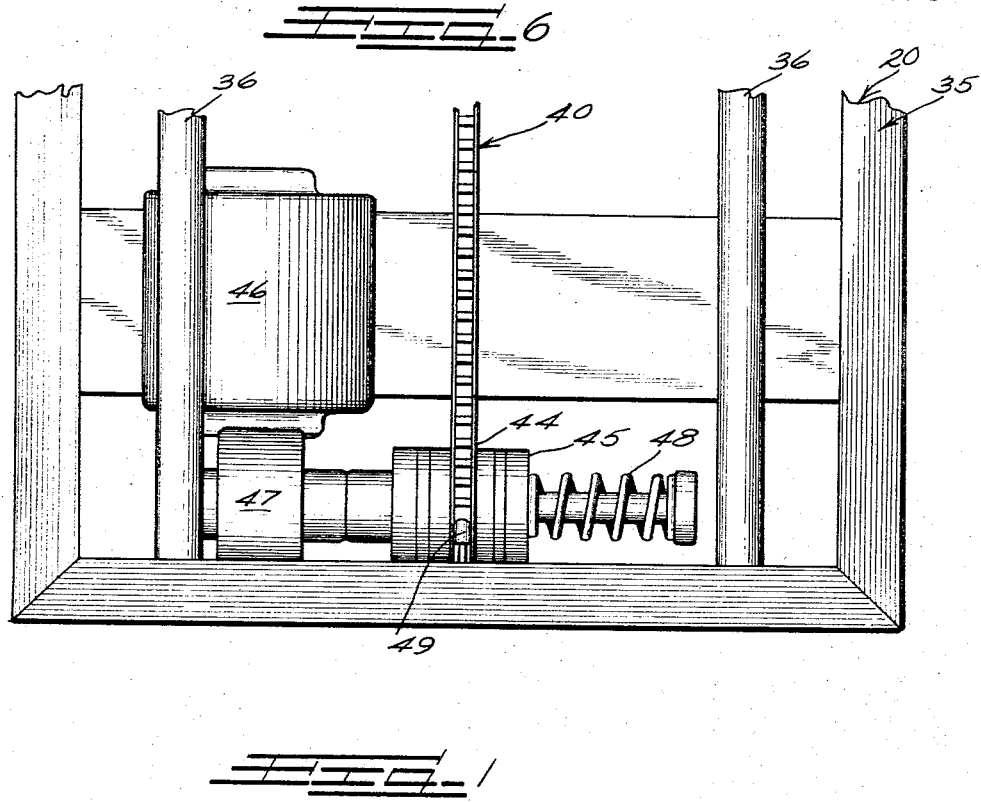
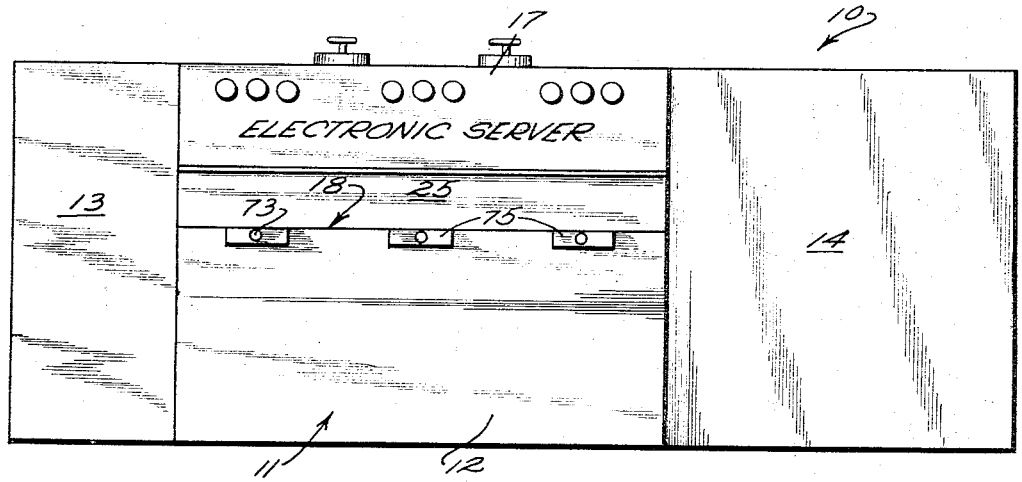
INVENTOR.
Harald L. Lindblad
Frank E. Lindblad
ATTORNEYS

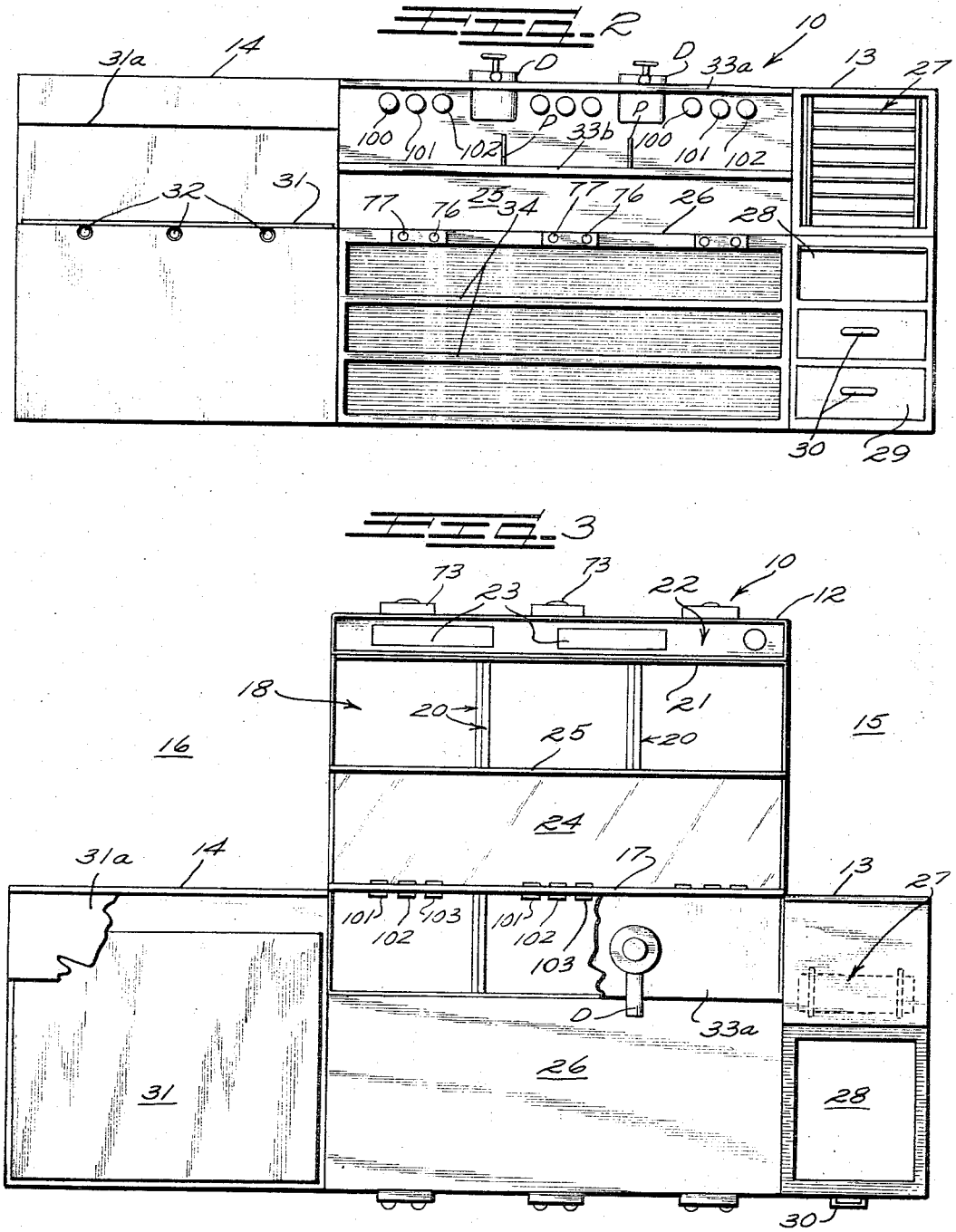

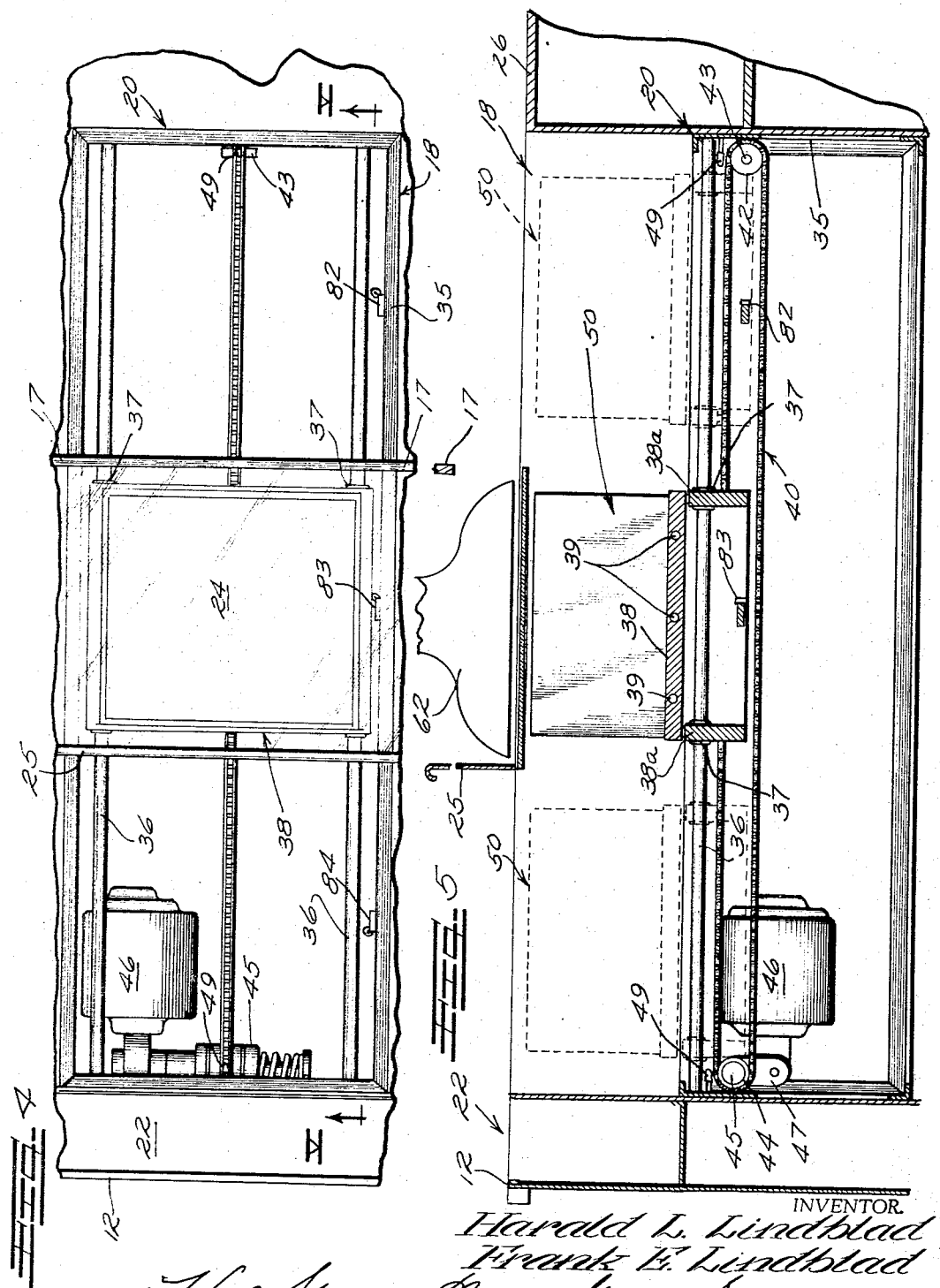

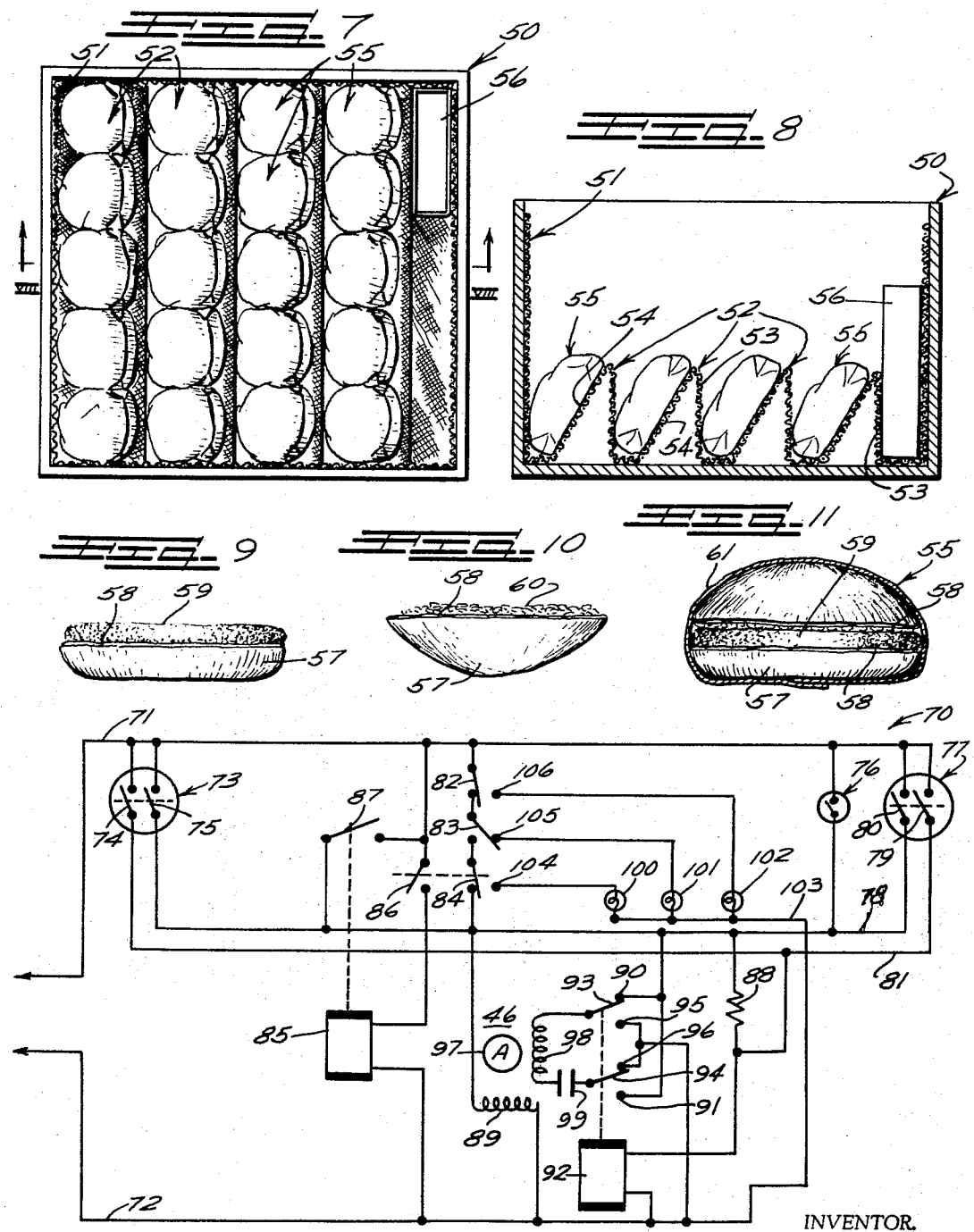

United States Patent Office 3,338,155
Patented Aug. 29, 1967

3,338,155
APPARATUS FOR MERCHANDIZING
HOT SANDWICHES
Harald L. Lindblad, 6316 W. Greenleaf Ave., Chicago, Ill. 60646, and Frank E. Lindblad, 6533 Nokomis Ave., Lincolnwood, Ill. 60645
Filed Jan. 30, 1964, Ser. No. 341,392
7 Claims. (Cl. 99—356)

ABSTRACT OF THE DISCLOSURE

A serving device having a food storage area controlled to maintain ready to eat foodstuff, such as hamburger sandwiches, in freshly prepared condition and positioned between receiving and dispensing stations with foodstuff receiving carriages movable between the stations and automatically returning from the stations to the storage area together with electric switch controls at said stations to selectively move the carriages to said stations.

This invention relates to the automatic storing and dispensing of perishable foodstuffs and the like and specifically deals with a system of preparing, storing and dispensing sandwiches such as hamburgers.

While the invention will be hereinafter described as embodied in a hamburger sandwich server or dispenser it should be understood that the system of this invention is generally applicable to the handling of perishable foodstuffs and the like.

According to the preferred embodiment of the invention hamburger sandwiches are prepared on an assembly table located between a grill and a toaster. Hamburger buns are split in half and the split inner faces of the bun halves are lightly toasted to seal the soft interior of the bun. The bun halves are delivered to the assembly table, one half is covered on the toasted face thereof with condiments such as catsup, mustard, pickles or the like and the other half is covered with a hot hamburger patty delivered from the grill. The thus covered bun halves are assembled and wrapped in paper which may be lightly waxed to prevent absorption of moisture from the hamburger sandwich but which retains a degree of porosity. Storage and dispensing containers, drawers, bins or the baskets are positioned on carriages disposed immediately in front of the assembly table. The wrapped sandwiches are deposited in the baskets preferably on racks which hold them in inclined easily reached positions. The carriages deliver the filled baskets to a moisture retaining storage area midway between the assembly area and a front dispensing area. The carriages are heated and the baskets on the carriages are composed of good heat transfer material such as aluminum so that the sandwiches will be kept at an elevated temperature consistent with the temperature of the freshly made hamburger patty therein. The baskets or the storage area are equipped with humidifying means to maintain a desired moistened atmosphere around the sandwiches in the basket. Movement of the carriages is electrically controlled and is automatic so that when a basket is to be delivered to the dispensing area, the sales person or counter man only presses a button which automatically advances the basket from the storage area to the dispensing area where the sandwiches are easily removed as desired. However the basket only remains in the dispensing area for a predetermined time interval and then is returned automatically to the storage area. When a basket is depleted of sandwiches, the assembly operator or sandwich man retracts the depleted basket from the storage area to the filling area immediately in front of the assembly table. When a basket has been retracted back to the filling area, the electrical control system will not permit movement to the dispensing position and the counter man can only effect movement of a basket from the storage station to the dispensing station.

The system of this invention makes possible the preassembly of a plurality of perishable sandwiches for use when needed thereby accommodating rapid dispensing during rush periods. The system maintains the perishable sandwich in the fresh heated condition of a newly prepared sandwich and extends the storage life of hamburgers and the like up to periods of one hour or more. The invention therefore makes possible the advance preparation of hamburger sandwiches for meeting rush period demands without the customer being aware of the fact that the sandwich was not just prepared at the time the order was placed. The system prevents the drying out of the hamburger patty such as normally occurs by attempting to meet rush period order by leaving a large number of patties on the grill and at the same time the toasted face of the bun prevents the bread from becoming soggy or absorbing the moisture of the patty and the condiments.

It is then an object of this invention to provide a system for serving fresh foodstuffs even after a considerable period of time has elapsed from the initial preparation of the food.

Another object of this invention is to extend the useful life of hot sandwiches such as hamburgers to enable dispensing of a griddle fresh hamburger sandwich even after the elapse of a considerable time period from the original preparation of the sandwich.

A still further object of this invention is to provide an automatic handling system for issembling, storing and serving of foodstuffs such as hamburger sandwiches and the like.

A still further object of this invention is to provide automatic apparatus for handling foodstuffs between assembly, storage, and serving stations.

Another specific object is to provide apparatus for restaurants, drive-ins and the like which is easily installed, operated with unskilled personnel and makes possible rush hour distribution of previously prepared perishable sandwiches having the original freshness, flavor and appearance of prepared to order sandwiches.

Another object of this invention is to provide automatic electrically operated apparatus for the handling of sandwiches or the like perishable foodstuffs in a restaurant, drive-in, or the like eating place.

Other and further objects of this invention will become apparent to those skilled in this art from the following detailed description of the annexed sheets of drawings which illustrate one preferred embodiment of this invention.

On the drawings:

FIGURE 1 is a front elevational view of the apparatus of this invention;

FIGURE 2 is a rear elevational view of the apparatus of this invention;

FIGURE 3 is a top plan view of the apparatus of this invention;

FIGURE 4 is a fragmentary plan view of one of the carriage modules embodied in the apparatus of this invention;

FIGURE 5 is a longitudinal cross-sectional view, with parts in elevation, and along the line V—V of FIGURE 4;

FIGURE 6 is an enlarged fragmentary plan view of the driving mechanism for the carriage module of FIGURES 4 and 5;

FIGURE 7 is a plan view of a box or drawer for the carriage modules of FIGURES 4 to 6;

FIGURE 8 is a transverse cross-sectional view along the line VIII—VIII of FIGURE 7;

FIGURES 9 to 11 are somewhat diagrammatic views illustrating the preparation of a hamburger sandwich according to this invention;

FIGURE 12 is a wiring diagram for the apparatus of this invention.

As shown on the drawings:

The apparatus 10 of FIGURES 1 to 3 is composed generally of cabinet and wall structure 11 preferably covered with stainless steel or the like attractive, easily cleaned sheet material. At the front the cabinet structure includes a vertical front wall 12 extending up to a convenient counter height. This counter height wall 12 is flanked on both sides by vertical partition walls 13 and 14 extending to eye level or above and positioned rearwardly from the wall 12 as shown in FIGURE 3 to provide recesses or floor areas 15 and 16 which can house other restaurant equipment such as a coffee maker, refrigerator, cabinets, or the like. An attractive vertical panel 17 of stainless steel or the like spans the space between the vertical walls 13 and 14 but terminates at a level above the wall 12.

The cabinet structure 11 provides an open topped bin area 18 extending rearwardly from the front wall 12 behind the walls 13 and 14 and under the panel 17 for receiving a plurality of carriage modules 20 of FIGURES 4 and 5 in side-by-side relation. A partition wall 21 is provided at the front end of the bin area 18 behind and parallel with the front wall 12 to provide an open top storage bin 22 at counter level at the front of the apparatus for receiving paper bags, containers, or the like, holding and packaging materials 23 for easy access to the counter man or waiter.

A flat heat resistant glass cover 24 spans the bin 18 immediately in front of the panel 17 at the counter top level of the front wall 12 and a vertical wall 25 spans the bin area 18 at the front edge of this glass cover 24. As shown in FIG. 3 the glass cover 24 in a front to rear direction spans about the middle third of the bin area with its rear edge terminating under the panel 17 and with its front edge terminating at the vertical wall 25 which, as shown in FIG. 1, rises to a level just lower than the bottom level of the panel 17 so that the glass cover 24 is hidden from the view of a customer at the front of the apparatus but is visible under the panel 17 to the view of the sandwich man at the rear of the assembly. The apparatus 10 is usually mounted behind a counter and while the waiter or counterman has visual access over the partition wall 25 to view the contents underneath the glass cover 24, the wall 25 will effectively obstruct such a view by the customer in front of the counter.

As shown in FIGS. 2 and 3 a table or assembly counter 26 is provided behind the bin area 18 level with the top of the bin. A vertical endless chain rack type toaster 27 is mounted at one side of the table 26 behind the wall 13 and discharges into an open top bin 28 in a storage cabinet 29 with drawers such as 30 for storing untoasted buns or bread. The buns are split in half, placed in the racks of the toasters to have their split faces lightly crusted or toasted to seal off the soft body of the bun and the toaster automatically dumps the toasted bun halves into the open topped bin 28 from which they are easily accessible to the assembly table 26. The bin may be heated to keep the toasted buns warm.

A grill or hot plate 31 is mounted alongside the other end of the assembly table 26 behind the wall 14 with the hot plate top level with the table 26. An exhaust hood 31a arrangement is provided behind the wall 14 to remove cooking odors, extraneous heat, cooking smoke, and the like. As shown the grill 31 is gas or electrically heated and controls such as 32 regulate the temperature of the grill. Shelves 33a and 33b are provided behind the panel 17 above the table 26. The top shelf 33a has receptacles for carrying condiment dispensers D while the shelf 33b has upright partitions P providing areas therebetween to receive stacks of sandwich wrapping paper. Shelves 34 are provided under the table 26 for storage purposes.

The assembly 10 of FIGS. 1 to 3 is sized for receiving three modules 20 of FIGS. 4 and 5 in side-by-side relation but it should be understood that any desired number of carriage modules can be provided in the apparatus of this invention.

The module 20 of FIGS. 4 and 5 includes an open rectangular framework 35 which can be composed of angle iron strips or the like structural frame material. The frame carries a track composed of spaced parallel rods or tubes 36 extending longitudinally from the front to the rear of the frame immediately under the top thereof. These rods support anti-friction bearing sleeves 37 which slide freely on the rods and are mounted in cross bars of a carriage frame 38a carrying a metal platen 38 preferably composed of aluminum and containing Calrod heating units such as 39. The platen 38 spans the space between the rods or tracks 36 at a level above the tracks. The platen 38 is driven along the length of the tracks by a chain drive 40 having an upper run with ends secured to the carriage frame 38a and an under run passing under the carriage assembly. The chain is trained around an idler sprocket 42 carried by a shaft 43 at the rear end of the frame 35 and around a drive sprocket 44 driven through a slip clutch 45 from an electric motor 46 at the front end of the frame 35. As shown in FIG. 6 the electric motor 46 is connected through a speed reducing drive 47 to the input side of the slip clutch 45 and an adjustable spring 48 is provided on the clutch to control the friction drive to the chain 40. Stops or abutments 49 are provided at the ends of the chain run on the frame 35 to receive the carriage or platen 38 thereagainst to limit the travel of the box at the front and rear ends of the tracks 36. When a stop 49 is engaged by the platen or carriage the clutch will slip and disengage the motor drive thereby preventing damige to the equipment. The spring 48 of the clutch can be loosened to disconnect the motor drive and permit manual operation of the carriage in the event of failure of the electrical drive or control system. In some installations manual operation may be sufficient.

The platen 38 supports on the top face thereof in intimate thermal conducting relation therewith an open top aluminum box or drawer 50 best shown in FIGURES 7 and 8. This box 50 has solid bottom and side walls to readily absorb heat from the platen. An expanded metal or wire mesh aluminum basket 51 is mounted in the box 50 and has vertical side walls sized to fit freely within the side walls of the box together with a bottom wall having raised rack portions 52 extending in a front to rear direction across the entire bottom of the basket. These racks 52 have vertical partitions or back walls 53 and sloping front or support walls 54 providing a plurality of rows in side-by-side relation in the basket with each row having an inclined supporting wall for a wrapped hamburger sandwich 55. As shown the wrapped sandwiches are placed in side-by-side relation on the inclined walls 54 in each row of the basket. Between the vertical wall 53 of one rack and the adjacent side wall of the basket there is provided an open top container 56 for water to humidify the contents of the box. It will be understood of course that any other suitable humidifying equipment could be used in place of the open topped container 56.

As indicated in FIGURES 9 to 11 the wrapped sandwiches 55 placed on the racks of the basket 51 are composed of toasted bun halves 57 each of which has the conventional body portion and a lightly toasted crust or sealed face 58 on the split area thereof. The face of one bun half, as shown in FIGURE 9, receives a freshly prepared hamburger patty 59 while the toasted face of the other bun half receives condiments 60 such as catsup, mustard, pickle and the like thereof. The half assemblies of FIGURES 9 and 10 are placed together to form the sandwich shown in FIGURE 11 with the toasted crusts 58 sealing off the body of the bun from rapid absorption of moisture from the hamburger patty or from the condiments. The wrapping 61 around the bun sandwich is composed of lightly waxed paper which will not blot or soak up moisture from the sandwich but at the same time will permit penetration or breathing of moisture from the humidifier 56 into the interior of the wrapped sandwich package.

The wrapped sandwich packages 55 are prepared on the assembly table 26 with the toasted buns being received from the bin 28 and the hamburger patties being received from the grill 31. The assembler actuates the carriages of the modules 20 in the bin area 18 to retract the desired partially filled or empty basket 51 to a rearmost position immediately in front of the assembly table 26 in a manner to be hereinafter described in detail. The open top level of each box 50 is substantially flush with the top of the assembly table 26 to facilitate easy filling of the basket. When a basket receives the desired number of sandwiches from the assembly table 26, the sandwich man releases the basket for automatic return to a storage area under the glass cover 24 where the filled basket will remain until the counter man depresses an actuating button for advancing the basket to the front dispensing position at the front bin 22.

As shown in FIG. 4, the pltaen 38 supporting the box 50 is heated by Calrod units such as 39 and the basket in the box will be kept at a temperature consistent with the temperature maintained by the Calrod units in the supporting platen or carriage. If it is desired to augment the heat input to the sandwiches in the storage area under the glass 24, secondary infra red heating lamps such as 62 can be provided over the glass cover 24 behind the partition wall 25.

The electrical circuit diagram for the serving apparatus of this invention is shown in FIG. 12 and is designated generally by the reference numeral 70. As therein shown, a source of alternating current is applied to a pair of input leads 71 and 72. A pushbutton switch 73 located on the front wall 12 of the apparatus has a pair of contacts 74 and 75 operated by the waiter or counterman when it is desired to bring a box or drawer 50 to the front sales or dispensing area. It will be understood that one front pushbutton 73 is provided for each module of this invention.

At the rear of the apparatus, preferably just under the assembly table, there are provided a pair of pushbutton switches 76 and 77 for each module to bring the box 50 back to the assembly area and to release it from this area after it is filled. The switch 76 is connected between the line 71 and a line 78. The switch or button 77 has a pair of contactors 79 and 80 with the contactor 80 being between the line 71 and the line 78 while the contactor 79 is between the line 71 and a line 81 back to the contactor 74.

A series of roller or microswitches 82, 83 and 84 are connected between the lines 71 and 78 and function as automatic stop switches to stop the motor 46 when the box or drawer has reached a desired location. As shown in FIGS. 4 and 5 these switches are carried in the module to be sequentially engaged by the carriage frame 38a as it moves to its various stations. Thus the switch 82 is at the rear receiving station, the switch 83 at the storage zone or station and the switch 84 at the dispensing station. One lead of a time delay relay 85 is connected to the line 71 through a contactor 86 which is operable with the contactor of the switch 84 and the other lead of the relay 85 is connected to the line 72. A contactor 87 is mounted on the time delay relay 85 and is connected between the lines 71 and 78.

Connected to the line 78 is one lead of a resistor 88, one lead of the winding 89 of the motor 46 and a pair of contacts 90 and 91 of a reversing relay 92. The other lead of the resistor 88 is connected to one lead of the relay 92 while the other lead of the relay is connected to the line 72. Mounted on the revering relay 92 are a pair of movable contactors 93 and 94 which are alternately connected to contacts 90 and 91 respectively and a pair of contacts 95 and 96 respectively. The motor 46 can be of the induction type which has an armature 97 between a pair of field windings 89 and 98. A capacitor 99 is connected in series with the winding 98 to produce a phase shift relative to the winding 89 for operation of the motor 46.

A plurality of indicating lamps 100, 101 and 102 are mounted on the panel and have one end thereof connected to a common lead 103 while the other ends are connected to a plurality of contacts 104, 105 and 106, respectively, which are actuated by the roller switches or microswitches 84, 83 and 82, respectively.

The schematic diagram of FIG. 12 shows the serving control in a neutral condition with the serving basket 50 in the central storage area in which the roller switch 83 is held actuated thereby removing power from the motor 46 and applying power to the light 101 which is preferably green. When the waiter or counterman actuates the pushbutton 73 the contactor 74 will energize the reversing relay 92 and the contactor 75 will energize the motor 46 to move the box 50 from the storage area to the front serving area. When the box has progressed a short distance toward the serving area the roller switch 83 is deactuated thereby connecting power through the roller switches to the line 78 and to the motor 46 allowing the pushbutton to be released while at the same time removing power from the green lamp 52. However when the pushbutton 15 is released the reversing relay will not be deenergized because sufficient power is applied therethrough through the series resistor 88 which is also connected to the line 78. Upon arrival in the front serving area the box 50 will actuate the roller switches 84 and 32 which removes power from the line 78 and deenergizes the motor and the reversing relay while applying power to the indicating lamp 100 which is preferably amber colored. At the same time the contactor 86 when closed energizes the time delay relay 85.

According to an important feature of the invention the time delay relay 85 allows the box 50 to remain in the serving area or front position for a short period of time after which it is automatically returned to the storage area with no manual operation required. The contact 87 is actuated in a time delay sequence after the relay 85 has been energized by the contactor 86. This action applies power to the line 78 from the line 71 through the contact 87 and energizes the motor to return the box to the storage area.

After the box 50 has progressed toward the storage area a short distance, the contactors 84 and 86 are closed and opened, respectively and simultaneously to maintain power on the motor 46 while at the same time power is removed from the amber indicating light 100. When the box 50 reaches the storage area the contact 83 will again open thereby deenergizing the motor 46 and stopping further motion of the box 50 while applying power to the green indicating lamp 101 to show that the box is in the storage area.

Should the box 50 be required in the preparation or rear area to be refilled, the pushbutton switch 76 is actuated applying power to the line 78 from the line 71 thereupon again operating the motor 46. The resistor 88 which is connected in series with the reversing relay 92 is of such value to prevent the reversing relay from being energized at this time. Then when the box 50 has progressed toward the preparation area a short distance, the roller switch 83 is deactuated thereby maintaining power on the line 78 and removing power from the amber indicating light 101. Then when the storage basket reaches the preparation area the roller switch 82 is actuated thereby deenergizing the motor and further stopping motion of the basket 50 while applying power to the red indicating lamp 102 to show that the box 50 is in the preparation area and should not be called forward by the counterman or waiter.

When the box 50 has been filled in the preparation area it is returned to the storage area by actuation of the switch 77. The contactor 79 is connected through the line 81 directly to the reversing relay 92 for energization thereof and the contactor 80 of the switch 77 is connected to the line 78 to energize the motor. When the storage box has progressed toward the storage area a short distance the roller switch 82 will then be deactuated causing the application of power from the line 71 through the roller switches 82, 83 and 84 to the line 78 to maintain the motor 46 and the reversing relay 92 energized. Upon arrival of the box 50 in the storage area the roller switch 83 is again actuated to deenergize the motor 46 and reversing relay 92 whereupon the green indicating lamp 101 will be energized through the contact 105.

From the above description it will be understood that the buttons 76 and 77 are controlled by the sandwich man from the assembly table. Thus when the storage box 50 is depleted the sandwich man merely actuates the button 76 to retract the box 50 to the rear of the module where it will remain until released by the sandwich man. At the same time the red light is energized to indicate to the waiter or counterman that the box 50 is not available for dispensing. When the sandwich man completes filling of the box 50 the switch 77 is energized thereby returning the box 50 to the storage area and shifting the red light indication to a green light indication showing the counterman that the box 50 is ready for dispensing. When the counterman depresses the button 76 the box 50 will advance to the dispensing front area, the green light will be changed to amber and the box 50 will only temporarily remain in the dispensing area, being automatically returned after a desired time interval.

As indicated in FIGS. 1 to 3 pushbutton switches 73 are located at the front of the unit for easy access to the counterman or waiter while the switches or buttons 76 and 77 are located at the rear of the unit for easy access to the assembler or sandwich man. The red, green and amber lights are located on the spanning panel 25 and are arranged to be visible from both the front and rear sides of the panel although of course the front indicator is all that need be used because the sandwich man has visible access to the position of the box 50 in each module.

From the above descriptions it should therefore be understood that this invention provides a system for the merchandising of perishable foodstuffs permitting a preassembly of hot sandwiches and the like followed by an automatic storage under conditions preserving the original condition of the sandwich plus the convenient dispensing of the stored sandwiches from the storage area to a selling or serving area under full control of a waiter or counterman. The preparation of the sandwiches by sealing the inner faces of the bun as by light toasting, the wrapping of the sandwiches in a non-absorbing but moisture permeable cover and the holding of the wrapped sandwiches in a temperature and moisture controlled storage area make possible the rapid merchandising of previously prepared foodstuffs which heretofore had to be prepared to order.

Although various minor modifications might be suggested by those versed in the art, it should be understood that we wish to embody within the scope of the patent granted hereon all such embodiments as reasonably and properly come within the scope of our contribution to the art.

We claim as our invention:

1. Serving apparatus adapted for restaurants which comprises in combination, a unit cabinet structure providing an open topped bin of counter-height, upright side walls extending laterally from both sides of the bin intermediate the front and rear ends thereof and projecting above the top of the bin to a height at least above eye level, a panel carried by the side walls spanning the bin in spaced relation thereabove, a vertical wall overlying the bin in front of the panel, a heat resistant glass cover over the bin between said vertical wall and said panel, a cooking grill behind one of said side walls, a toaster behind the other of said side walls, an assembly counter behind the bin between the grill and toaster, a plurality of carriages in the bin in side-by-side relation arranged for front to rear movement from the assembly counter to the front of the bin, a food supporting container carried by each carriage, means for heating each container, means for supplying moisture to each container, separate drive means for moving each carriage along the length of the bin, and electrical controls for actuating each drive means to position the carriage under the glass cover in the bin, to retract and hold the carriage at the rear end of the bin, to return the carriage to the storage area under the glass cover, to advance the carriage to the front of the bin and to automatically return the carriage from the front of the bin to the storage area after a predetermined time interval.

2. Apparatus for merchandising of hot sandwiches which comprises in combination, a unit cabinet structure of counter height providing an open top bin, upright walls on each side of the cabinet structure extending at least to eye level and positioned intermediate the front and rear ends of the cabinet structure, a vertical panel overlying the cabinet structure carried by the side walls and terminating in spaced relation above the bin, a partition wall extending upwardly from the cabinet structure in spaced relation forwardly of the panel and terminating at a level adjacent the bottom of the panel, a heat resistant cover overlying the bin behind said partition wall and terminating under the panel, a plurality of conveyor units in side-by-side relation in the bin, a carriage in each conveyor unit mounted for reciprocating movement between the front and rear of the bin, sandwich producing and assembling apparatus behind the side walls and cabinet, basket means on the carriages adapted to receive sandwiches from the apparatus at the rear of the cabinet, means for heating the baskets and applying moisture thereto, electric drive means for the carriages, and electrical control apparatus positioning the carriages and baskets thereon under the cover and moving the baskets therefrom to the front and rear ends of the bin for dispensing sandwiches therefrom and for receiving sandwiches from the apparatus at the rear of the cabinet.

3. A hamburger sandwich merchandising apparatus which comprises in combination, a unit cabinet structure defining an open topped bin, a sandwich assembly counter at the rear of the cabinet structure, a plurality of carriages in the bin mounted for front to rear movement from the assembly counter to the front of the cabinet, electrical controls for actuating the carriages, means overlying the bin providing a confined storage area for the carriages, hamburger sandwich carrying baskets on the carriages, means for heating the baskets, means for humidifying the contents of the baskets, and electric controls for moving the carriages from the storage area to the assembly counter area and to the front of the cabinet, said electrical controls including time delay mechanism for automatically returning the carriages to the storage area from the front of the cabinet.

4. A device for storing and dispensing perishable foodstuffs which comprises in combination, a cabinet providing a bin, a carriage reciprocatorily mounted along the length of the bin, a foodstuff receiving container on the carriage, a storage zone overlying the container midway between the front and rear ends of the bin, means for heating the container, means for humidifying the contents of the container, an electrical control for moving the carriage from the storage zone to the front of the bin and automatically returning the carriage back to the storage zone, and an additional electrical control for moving the carriage from the storage zone to the rear of the bin for receiving additional foodstuffs.

5. Apparatus for storing and dispensing perishable foodstuffs which comprises in combination an open topped bin, a conveyor mechanism in said bin, a carriage movable by said conveyor mechanism along the length of said bin, a foodstuffs receiving basket supported on said carriage in heat transfer relation therewith, a cover overlying a central portion of said bin adapted to receive the carriage and basket thereunder, means for heating said basket, means for humidifying the contents of said basket, control buttons at the front and rear ends of said bin, and an electrical control actuated by said control buttons for driving the conveyor mechanism to move the carriage along the length of the bin and to automatically stop the carriage under the cover and at the ends of the bin.

6. A device for merchandising hot hamburger sandwiches which comprises in combination, spaced parallel tracks extending from a rear receiving station to a front dispensing station, a carriage mounted for movement on said tracks, an endless chain underlying said tracks having a top run attached to said carriage, a slip clutch driving said chain, an electric motor driving said clutch, means overlying said carriage between said receiving and dispensing stations providing a confined zone, a sandwich receiving basket on said carriage, means for heating the contents of the basket on the carriage, means for controlling the humidity of the contents of the basket, an electrical circuit controlling the energization of said motor, pushbutton switches at the ends of the tracks controlling said circuit, and means in said circuit automatically returning the basket from the dispensing station to the confined central zone after a predetermined time interval.

7. A device for the merchandising of hot hamburger sandwiches which comprises, in combination, a conveyor system extending between a receiving station and a dispensing station, a carriage driven by said conveyor system, an electrical control operating said conveyor system, switches at said receiving and dispensing stations for energizing said electrical control, a sandwich receiving box on said carriage in thermal relation therewith, means for heating said carriage and box, an open mesh basket in said box having inclined sandwich receiving racks along the bottom thereof, a water container in said basket for maintaining a desired humidity in the box, and means overlying the box between the receiving and dispensing stations for confining the heat and moisture of the box.

References Cited

UNITED STATES PATENTS

| | | | |
|---|---|---|---|
| 1,176,266 | 6/1929 | Flamm | 107—1 |
| 2,337,117 | 12/1943 | Lloyd | 107—1 |
| 2,669,323 | 2/1954 | Hilliker | 186—1 |
| 2,900,045 | 8/1959 | Conklin et al. | 186—1 |
| 3,170,541 | 2/1965 | Werner | 186—1 |
| 3,183,856 | 5/1965 | Jolly | 107—1 |

R. N. JONES, *Primary Examiner.*